(No Model.) 2 Sheets—Sheet 1.
J. L. O. KING.
COMBINED PLANTER, FERTILIZER DISTRIBUTER, AND CULTIVATOR.
No. 585,916. Patented July 6, 1897.
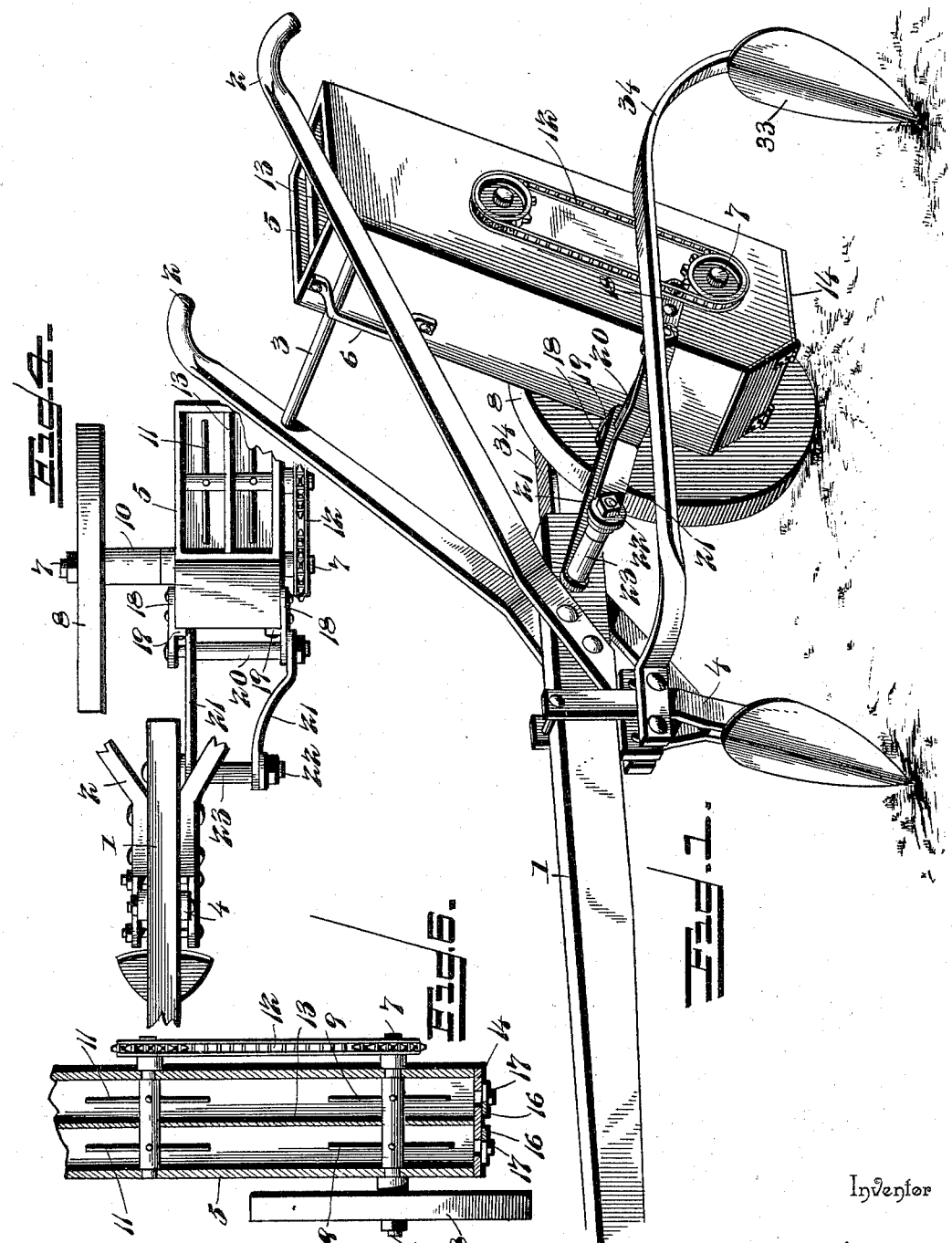

(No Model.) 2 Sheets—Sheet 2.
J. L. O. KING.
COMBINED PLANTER, FERTILIZER DISTRIBUTER, AND CULTIVATOR.
No. 585,916. Patented July 6, 1897.
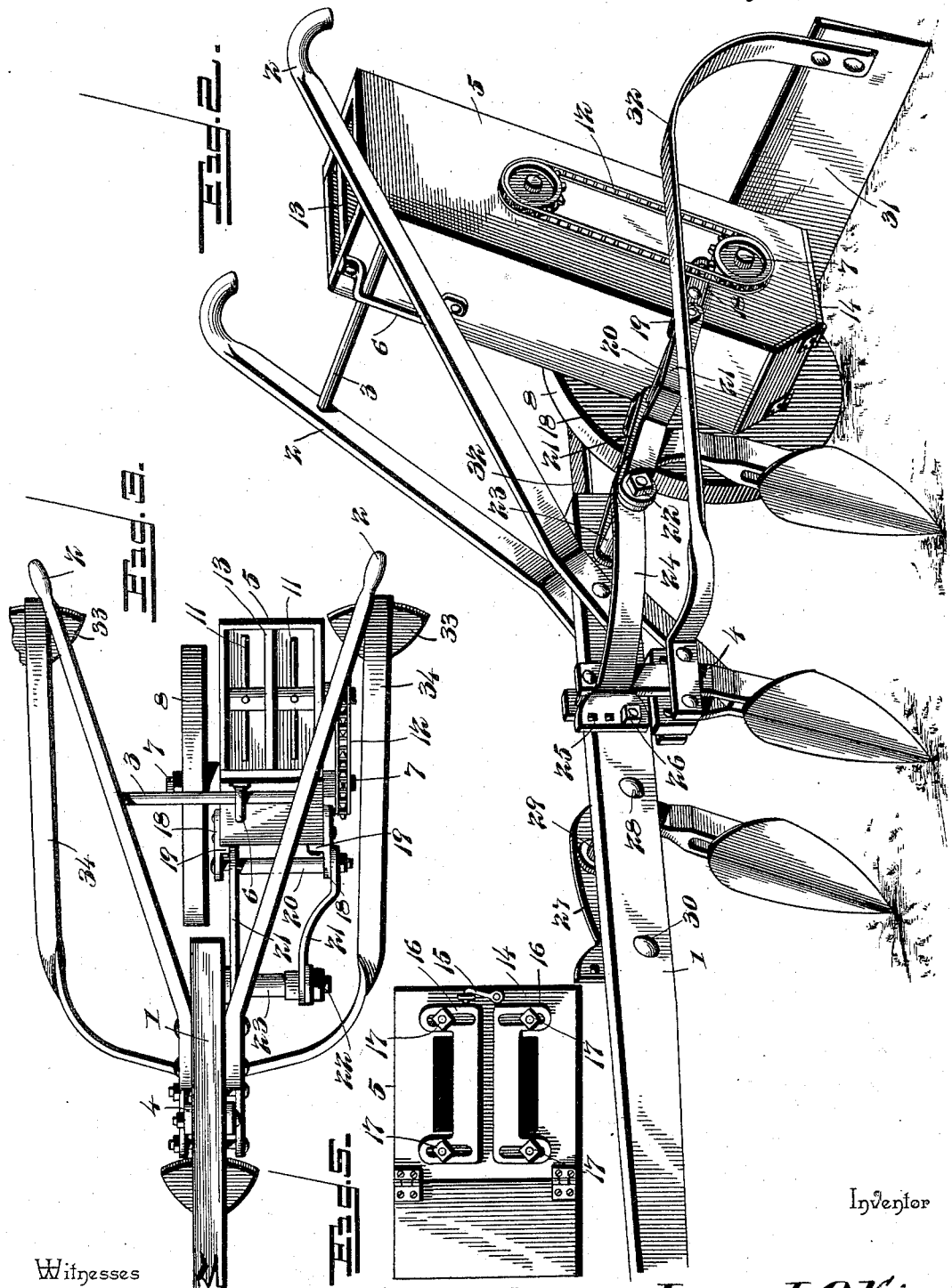

UNITED STATES PATENT OFFICE.

JAMES L. O. KING, OF FAIR PLAY, SOUTH CAROLINA.

COMBINED PLANTER, FERTILIZER-DISTRIBUTER, AND CULTIVATOR.

SPECIFICATION forming part of Letters Patent No. 585,916, dated July 6, 1897.

Application filed September 30, 1896. Serial No. 607,462. (No model.)

*To all whom it may concern:*

Be it known that I, JAMES L. O. KING, a citizen of the United States, residing at Fair Play, in the county of Oconee and State of South Carolina, have invented a new and useful Combined Planter, Fertilizer-Distributer, and Cultivator, of which the following is a specification.

This invention relates to agricultural implements for tilling and preparing the soil for planting, sowing seed, distributing fertilizer, and cultivating.

One of the objects in view is to utilize a plow-stock as the means for supporting the various attachments, such as the shovels, plow-points, planting and fertilizer-distributing mechanism, and coverers, thereby obviating the cost incident to providing a complete implement for each particular work. The parts are adjustable, removable, and interchangeable, thereby enabling the plow-stock to be equipped to perform the required work.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the implement as it will appear when in condition for sowing seed or distributing fertilizer. Fig. 2 is a view similar to Fig. 1, showing a series of plow-points for breaking and preparing the land in advance of the seed-dropping mechanism and a board for covering the seed in the rear of the planting mechanism. Fig. 3 is a top plan view showing the ground-wheel arranged to run in the furrow. Fig. 4 is a detail view showing the ground-wheel arranged to run to one side of the furrow. Fig. 5 is a view of the lower end of the hopper, showing the openings for the escape of the grain and fertilizer. Fig. 6 is a detail section of the lower portion of the hopper.

Corresponding and like parts are referred to in the following description and indicated in the several views of the accompanying drawings by the same reference-characters.

The plow-beam 1, of ordinary construction, is provided with the usual handles 2, which are connected at their lower ends to the rear portion of the beam and are connected near their upper ends by a cross-brace 3. A standard 4 is secured to the rear portion of the plow-beam and bears a shovel or point for opening or treating the ground. This standard 4, with its shovel, opens the ground when the implement is designed for sowing seed, the latter dropping into the furrow thus provided.

The planting mechanism consists of a hopper 5, suitably connected with the plow-beam and having a keeper 6 near its upper end, through which passes the cross-brace 3 and by means of which the hopper is adapted to rise and fall and is at the same time held in an upright position, and a shaft 7, journaled in the sides of the hopper and located at the lower end thereof.

One end of the shaft 7 is projected and receives a ground-wheel 8, and a series of spikes 9 are secured to the shaft and operate in the hopper so as to insure a positive feed of the grain and fertilizer through the openings in the bottom of the hopper. Usually the ground-wheel is arranged so as to run in the furrow, but when from any cause it is desired to have the ground-wheel run to one side of the furrow it is moved outward upon the shaft 7, a washer or collar 10 being interposed between the ground-wheel and the opposing side of the hopper to hold the ground-wheel at the required position. A toothed wheel 11 is located about midway of the hopper, and its shaft has a sprocket-wheel which is connected by means of a sprocket-chain 12 with a companion sprocket-wheel on the shaft 7, whereby motion is transmitted to the said toothed wheel for the purpose of agitating and loosening the fertilizer and grain, thereby preventing the same from banking in the hopper. For sowing seed and simultaneously distributing fertilizer the hopper is subdivided into vertical compartments by a partition 13, and the bottom 14 has openings opposite the said compartments for the egress of the contents thereof. This bottom 14 is hinged at one side, so as to be turned down to admit of access being readily had to the interior of the hopper, and when closed is fastened by a catch 15 or any suitable means. The size of the openings is regulated by gage-plates 16, which have their ends slotted for the passage of bolts or fastenings having binding-nuts 17, so as to secure the plates in the located positions. Strap-irons 18 are secured to the opposite sides of the hopper and extend forwardly thereof and have inwardly-extending lugs 19, which engage with the front side of the hopper and prevent any movement of the strap-irons upon their fastenings. The forwardly-extending ends of the strap-irons are apertured, and a bolt 20, passing through the openings of the irons 18, connects the rear ends of links 21 therewith, the front ends of the links 21 having connection with the plow-beam in any convenient way. A bolt 22, projecting laterally from a side of the plow-beam 1, receives the front ends of the links 21 and is supplied with a spacing-sleeve 23, which comes between the front ends of the said links and holds them the proper distance apart. A stub-beam 24, bearing a shovel or plow-point, is mounted upon the outer end of the bolt 22, so as to tilt vertically thereon, thereby admitting of the pitch of the plow-point or shovel being changed at will. The front end of the stub-beam 24 is expanded and provided with a series of openings 25 to receive a pin or bolt 26, by means of which the stub-beam is held in the required adjusted position. The front portion of the stub-beam is deflected or curved toward the plow-beam 1, so as to admit of its front end bearing directly against the side of the beam 1.

A stub-beam 27, the counterpart of the stub-beam 24, is placed upon the opposite side of the plow-beam 1 and is mounted upon a laterally-extending bolt 28 and is held the required distance from the beam 1 by a spacing-sleeve 29. This stub-beam 27 is provided with a plow-point or shovel, according to the nature of the work to be performed, and is held in an adjusted position by a pin or bolt 30 passing through one of a series of openings in its expanded front end. The stub-beams may be set so as to aline transversely with the standard 4 or, as shown, can be arranged the one in advance and the other in the rear of the standard 4, whereby the shovels or plow-points will operate successively and in the rear of one another.

The character of the covering means will depend upon the nature of the soil and in same instances a covering-board will be employed and in other cases covering-blades. The covering-board 31 is attached to spring-arms 32, which in turn are fastened to the plow-beam in any convenient way, and, as shown, the front ends of the spring-arms are curved inwardly and their end portions are bent to extend parallel and are clamped against the sides of the standard 4. The covering-blades 33 are carried by bars 34, which are secured to the plow-beam in any way found most advantageous and in substantially the same manner as the spring-arms 32.

The planting attachment can be used for sowing any kind of grain or seed and may be employed for dropping seed solely or for distributing fertilizer, or for performing both operations at the same time, in which case the seed will be placed in one compartment of the hopper and the fertilizer in the other compartment, each escaping through the opening in the bottom opposite the respective compartment.

Having thus described the invention, what is claimed as new is—

1. In combination with a plow-beam having a furrow-opener and handles connected by a cross-brace, a bolt projecting laterally from the beam, a hopper, a keeper applied to the upper end of the hopper and receiving the cross-brace of the handles, strap-irons secured to the lower portion of the hopper and having inwardly-extending lugs, links having pivotal connection at their rear ends with the said strap-irons and at their front ends with the laterally-extending bolt, a shaft journaled in the sides of the hopper and provided with spikes, and a ground-wheel mounted upon a projecting end of the said shaft, substantially as and for the purpose set forth.

2. In combination with a plow-beam having a furrow-opener and handles connected by a cross-brace, a bolt projecting laterally from the beam, a hopper having loose connection with the cross-brace of the handles, links having pivotal connection at their ends with the hopper and laterally-extending bolt, a stub-beam pivotally mounted upon the outer end of the said lateral bolt and having its forward portion deflected toward the plow-beam, thence forwardly to touch the side of the said beam, and having its end portion expanded vertically and formed with a series of openings, means for adjustably connecting the front end of the stub-beam with the plow-beam, a shaft journaled in the sides of the hopper, and a ground-wheel secured to the said shaft, substantially as and for the purpose set forth.

3. In combination, a plow-beam having handles connected by a cross-brace, a standard secured to the plow-beam and provided with a shovel, a bolt projecting laterally from the plow-beam, a hopper having loose connection with the said cross-brace, links loosely connecting the hopper with the said lateral bolt, a shaft journaled in the sides of the hopper, a ground-wheel secured to the said shaft, a washer or collar mounted upon the shaft between the ground-wheel and the adjacent side of the hopper so as to properly position the ground-wheel, and spring-arms extending along the sides of the hopper and having their front ends deflected inwardly, thence forwardly, and clamped against the sides of the aforementioned standard, and bearing an earth-treating device at their rear ends, substantially as set forth.

In testimony that I claim the foregoing as my own I have hereto affixed my signature in the presence of two witnesses.

JAMES L. O. KING.

Witnesses:
P. L. PULLEN,
J. W. ALLEN.